US012645834B2

(12) United States Patent
    Kavali et al.

(10) Patent No.:  US 12,645,834 B2
(45) Date of Patent:  Jun. 2, 2026

(54) SYSTEM AND METHOD FOR GENERATING ANONYMIZATION SCRIPTS TO OPTIMIZE DATA ANONYMIZATION FOR LARGE DATABASES

(71) Applicant: Bank of America Corporation, Charlotte, NC (US)

(72) Inventors: Rama Venkata S. Kavali, Frisco, TX (US); Venugopala Rao Randhi, Hyderabad (IN); Lawrence Anthony D'Silva, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 43 days.

(21) Appl. No.: 18/913,271

(22) Filed: Oct. 11, 2024

(65) Prior Publication Data

US 2026/0105187 A1     Apr. 16, 2026

(51) Int. Cl.
G06F 21/62        (2013.01)
G06F 16/242       (2019.01)

(52) U.S. Cl.
CPC ...... G06F 21/6254 (2013.01); G06F 16/2433 (2019.01)

(58) Field of Classification Search
CPC ...... G06F 21/60; G06F 21/62; G06F 21/6254; G06F 16/2433; G06F 16/242
See application file for complete search history.

(56) References Cited

U.S. PATENT DOCUMENTS

| | | | |
|---|---|---|---|
| 7,890,530 B2 | 2/2011 | Bilger et al. | |
| 8,468,345 B2 | 6/2013 | Auradkar et al. | |
| 8,626,749 B1 * | 1/2014 | Trepetin .............. | G06F 21/6254 |
| | | | 707/722 |
| 9,292,696 B1 * | 3/2016 | Kothari ................... | G06F 21/60 |
| 9,734,169 B2 | 8/2017 | Redlich et al. | |
| 9,734,343 B2 * | 8/2017 | Galil ................... | G06F 21/6245 |
| 10,685,139 B2 | 6/2020 | Harp | |
| 10,771,247 B2 | 9/2020 | Luce et al. | |
| 10,817,466 B2 | 10/2020 | Reddy et al. | |

(Continued)

OTHER PUBLICATIONS

Rama Venkata Kavali, et al.; System and method for federated execution of anonymization tasks for large databases; U.S. Appl. No. 18/913,540, filed Nov. 10, 2024.

(Continued)

*Primary Examiner* — Shanto Abedin

(57)        ABSTRACT

A system accesses database tables comprising sensitive data, collecting data elements corresponding to the sensitive data, reduces the data elements to a distinct list of data elements, generates a first script to generate map tables for each data element, wherein each map table comprises a first column to hold original values of the data element and a second column to hold anonymized values for the original values, generates a second script to scan the database tables to collect original values for each data element and populate the original values in a respective map table, generates a third script to anonymize the collected original values for each data element and populate the anonymized values in a respective map table, and generates a fourth script to update the original values using the corresponding anonymized values in the database tables based on the map tables.

17 Claims, 8 Drawing Sheets

(56)             References Cited

U.S. PATENT DOCUMENTS

| | | | |
|---|---|---|---|
| 10,892,899 B2 | | 1/2021 | Shelton, IV et al. |
| 11,106,820 B2 * | | 8/2021 | Oberhofer ............... G06F 16/21 |
| 11,176,088 B2 | | 11/2021 | Reddy et al. |
| 11,188,791 B2 * | | 11/2021 | Choudhury ....... G06F 18/23213 |
| 11,636,136 B2 | | 4/2023 | Wilshinsky |
| 11,829,514 B2 | | 11/2023 | Ardhanari et al. |
| 11,848,082 B2 | | 12/2023 | Aravamudan et al. |
| 11,941,155 B2 | | 3/2024 | Sohail et al. |
| 12,058,133 B2 | | 8/2024 | Mital et al. |
| 2006/0248592 A1 | | 11/2006 | Agrawal et al. |
| 2015/0067881 A1 * | | 3/2015 | Badstieber .............. G06F 16/13 |
| | | | 726/26 |
| 2019/0205566 A1 | | 7/2019 | Shelton, IV et al. |
| 2021/0026982 A1 | | 1/2021 | Amarendran et al. |
| 2021/0097203 A1 * | | 4/2021 | Isoda .................. G06F 16/2246 |
| 2021/0124843 A1 | | 4/2021 | Vass et al. |
| 2021/0322017 A1 | | 10/2021 | Shelton, IV et al. |
| 2022/0391537 A1 * | | 12/2022 | Gotthardt .............. H04W 12/02 |
| 2023/0007439 A1 | | 1/2023 | Williams et al. |
| 2023/0058906 A1 * | | 2/2023 | Jansen ................ G06F 21/6254 |
| 2023/0315893 A1 | | 10/2023 | Levandoski et al. |

OTHER PUBLICATIONS

Rama Venkata Kavali, et al.; System and method for self-governing and self-monitoring task execution for data anonymization; U.S. Appl. No. 18/913,390, filed Nov. 10, 2024.

* cited by examiner

300

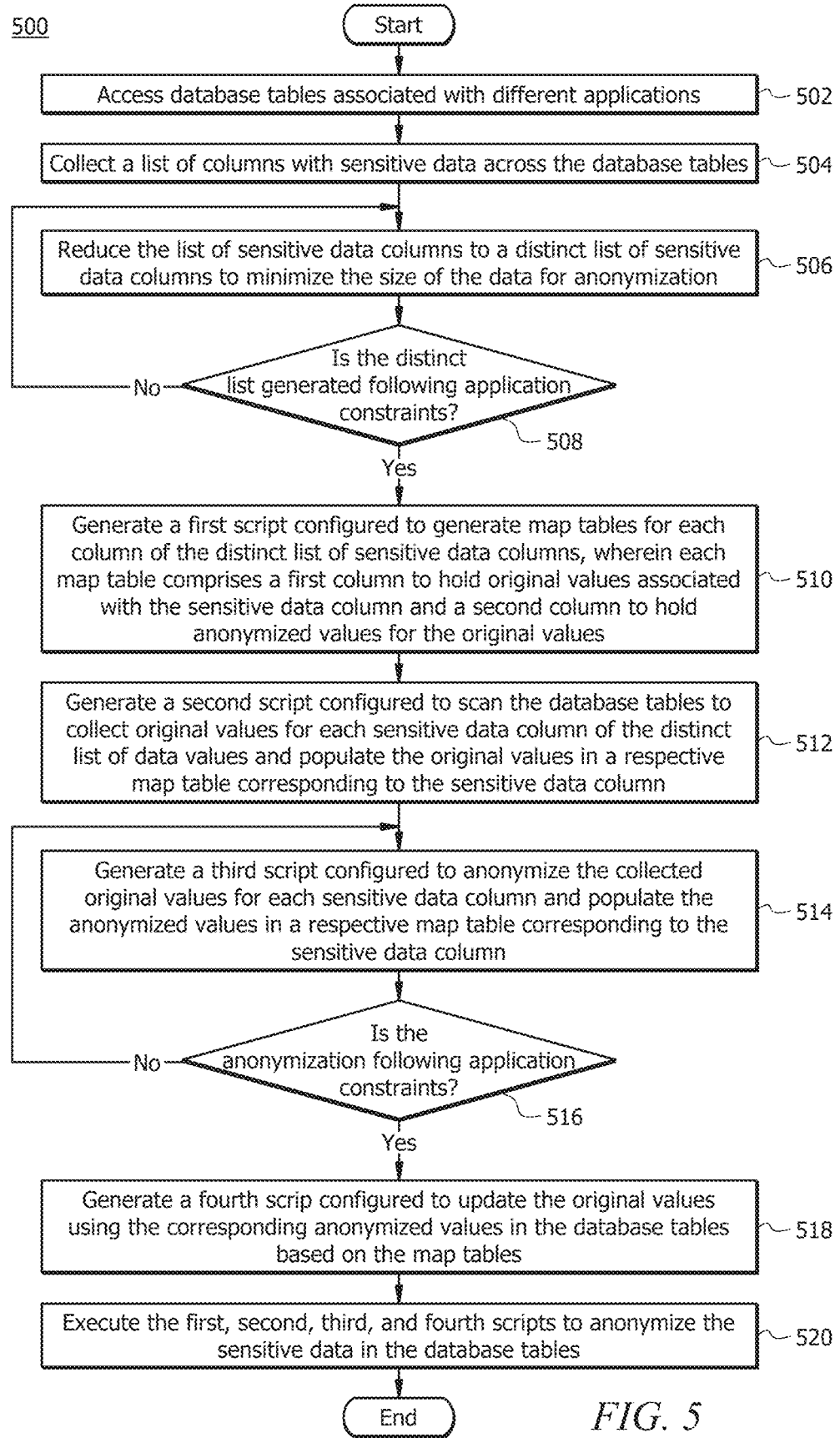

500

Start

Access database tables associated with different applications ~ 502

Collect a list of columns with sensitive data across the database tables ~ 504

Reduce the list of sensitive data columns to a distinct list of sensitive data columns to minimize the size of the data for anonymization ~ 506

Is the distinct list generated following application constraints? ~ 508

No

Yes

Generate a first script configured to generate map tables for each column of the distinct list of sensitive data columns, wherein each map table comprises a first column to hold original values associated with the sensitive data column and a second column to hold anonymized values for the original values ~ 510

Generate a second script configured to scan the database tables to collect original values for each sensitive data column of the distinct list of data values and populate the original values in a respective map table corresponding to the sensitive data column ~ 512

Generate a third script configured to anonymize the collected original values for each sensitive data column and populate the anonymized values in a respective map table corresponding to the sensitive data column ~ 514

Is the anonymization following application constraints? ~ 516

No

Yes

Generate a fourth scrip configured to update the original values using the corresponding anonymized values in the database tables based on the map tables ~ 518

Execute the first, second, third, and fourth scripts to anonymize the sensitive data in the database tables ~ 520

End

*FIG. 5*

SYSTEM AND METHOD FOR GENERATING ANONYMIZATION SCRIPTS TO OPTIMIZE DATA ANONYMIZATION FOR LARGE DATABASES

TECHNICAL FIELD

The present disclosure relates generally to data anonymization, and more specifically, to a system and method for generating anonymization scripts to optimize data anonymization for large databases.

BACKGROUND

Data anonymization is a process by which sensitive data is altered in such a way that a data subject can no longer be identified directly or indirectly, either by the data controller alone or in collaboration with any other party. Data anonymization may enable the transfer of information while reducing the risk of unintended disclosure, and in certain environments in a manner that enables evaluation and analytics post-anonymization.

Data anonymization is important for preventing sensitive data from being accessed by unauthorized entities. Data anonymization for large databases faces several technical challenges due to the volume and nature of the data across these databases. For example, one technical challenge includes preserving data relationships and/or constraints to maintain data consistency during the anonymization. Conventional anonymization techniques do not remediate these technical challenges.

SUMMARY

The system disclosed in the present application provides a technical solution to the problems discussed above. The disclosed anonymization system can generate scripts for data anonymization for large databases. The anonymization system firstly identifies columns with sensitive data across multitude of database tables and reduces them to distinct set of columns with sensitive data to remove redundancy of the columns. The anonymization system further generates multiple scripts for different tasks related to data anonymization. One scrip is configured to create map tables for each distinct column. A map table includes two columns, one of them to hold un-anonymized values and one of them to hold corresponding anonymized values. Another script is configured to scan all database tables to collect unique data values for each column with sensitive data and populate un-anonymized values in respective map tables. Another script is configured to anonymize un-anonymized data values and populate anonymized data in the corresponding column in the map tables. Lastly, another script is configured to update corresponding un-anonymized values in all database tables.

In one embodiment, the disclosed system for data anonymization includes a memory operable to store a plurality of database tables comprising sensitive data. The disclosed system also includes a processor operably coupled to the memory. The processor is configured to collect a list of data elements corresponding to the sensitive data from the plurality of database tables. The processor is then configured to reduce the list of data elements to a distinct list of data elements by removing redundant data elements from the list of data elements. The processor is then configured to generate a first script configured to generate map tables for each data element of the distinct list of data elements. Each map table includes a first column to hold original values associated with the data element and a second column to hold anonymized values for the original values. The processor is then configured to generate a second script configured to scan the plurality of database tables to collect original values for each data element of the distinct list of data values and populate the original values in a respective map table corresponding to the data element. The processor is then configured to generate a third script configured to anonymize the collected original values for each data element and populate the anonymized values in a respective map table corresponding to the data element. The processor is further configured to generate a fourth script configured to update the original values using the corresponding anonymized values in the plurality of database tables based on the map tables.

In one embodiment, the processor of the disclosed system is further configured to execute the first, second, third, and fourth scripts to anonymize the sensitive data in the plurality of database tables.

In one embodiment, anonymizing the collected original values for each data element includes anonymizing the collected original values for a first data element across the plurality of database tables using a same rule, a same calculation, or a same algorithm.

In one embodiment, the processor of the disclosed system is further configured to transform the original values for a first data element based on a first logic, wherein the first logic applies to the anonymized values for the first data element.

In one embodiment, anonymizing the collected original values for each data element includes anonymizing the collected original values for a first data element in a first database table. The first database table is associated with a first application. Accordingly, anonymizing the collected original values for the first data element in the first database table is based on one or more rules associated with the first application.

In one embodiment, the processor of the disclosed system is further configured to validate the anonymization of the collected original values for each data element.

In one embodiment, the sensitive data includes non-public personal information (NPPI).

In one embodiment, accessing the plurality of database tables, collecting the list of data elements, or reducing the list of data elements to the distinct list of data elements is based on structured query language (SQL).

The disclosed system and methods provide the practical application of efficient data anonymization for large databases using a variety of scrips configured for different anonymization tasks. Data anonymization is important for preventing sensitive data from being accessed by unauthorized entities. In large databases, efficiency is another important consideration for data anonymization. The disclosed system and methods can address such problems by generating different scripts for data anonymization for large databases. The scripts can be executed in a distributed manner. Specifically, the scripts can be executed concurrently at different processors, reducing the overall execution time compared to a single large script which needs to be executed sequentially. In addition, as the size of the large databases grows, the data anonymization tasks also grow in size and complexity. The disclosed system and methods can scale up by modifying current scripts or generating new scripts to handle the scaled tasks. Furthermore, distributing the execution of the scripts to different processors can allow efficient use of the computing resources of the processors. As described in example embodiments of the present disclosure, an anonymization system firstly identifies columns with sensitive data across multitude of database tables and reduces them to distinct set of columns with sensitive data to remove redundancy of the columns, which can minimize the size of data for anonymization. The anonymization system further generates multiple scripts for different tasks related to data anonymization. One scrip is configured to create map tables for each distinct column with sensitive data. Another script is configured to scan all database tables to collect unique data values for each column with sensitive data and populate un-anonymized values in respective map tables. Another script is configured to anonymize un-anonymized data values and populate anonymized data in the corresponding column in the map tables. Another script is configured to update corresponding un-anonymized values in all database tables. These scripts are related yet they can be separately executed to improve the execution efficiency for data anonymization across large databases.

Technical advantages of certain embodiments of this disclosure may include one or more of the following. Since each script can be separately executed, the disclosed system and methods can execute the scripts for data anonymization in parallel across multiple processors, which reduces the overall execution time for all scripts. In addition, using multiple processors to execute these scripts can lead to efficient use of the computing resources of the processors. Furthermore, the anonymization tasks can be distributed among scripts based on performance objectives, which improves overall system performance as no script will need to be overwhelmed. Moreover, the execution of data anonymization tasks can be more robust due to the separate executions of the scripts. For example, if one script encounters an error, the other scripts can be still executed without any issue. Besides the above technical advantages, the generated scrips are agnostic to database platforms as each script is modularized and can be reused in different database platforms. The disclosed system and methods can also easily handle new columns with sensitive data as more databases are added for data anonymization tasks. For example, current scripts can be easily modified to handle the new columns with sensitive data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an example flowchart of a method for generating scripts to anonymize large databases.

DETAILED DESCRIPTION

Figure 1:
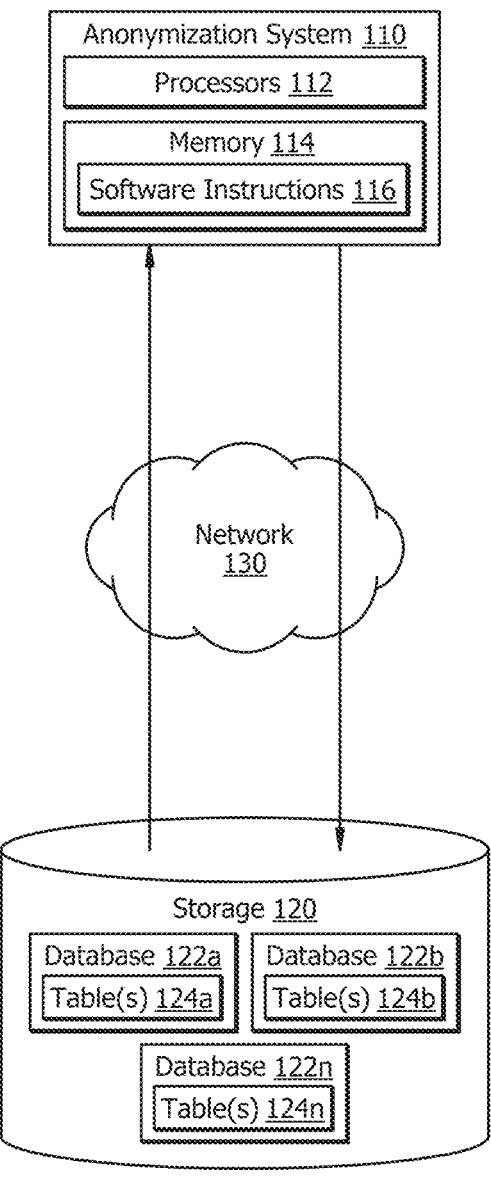
FIG. 1 illustrates one embodiment of a system that is configured for data anonymization for large databases.
Figure 2:
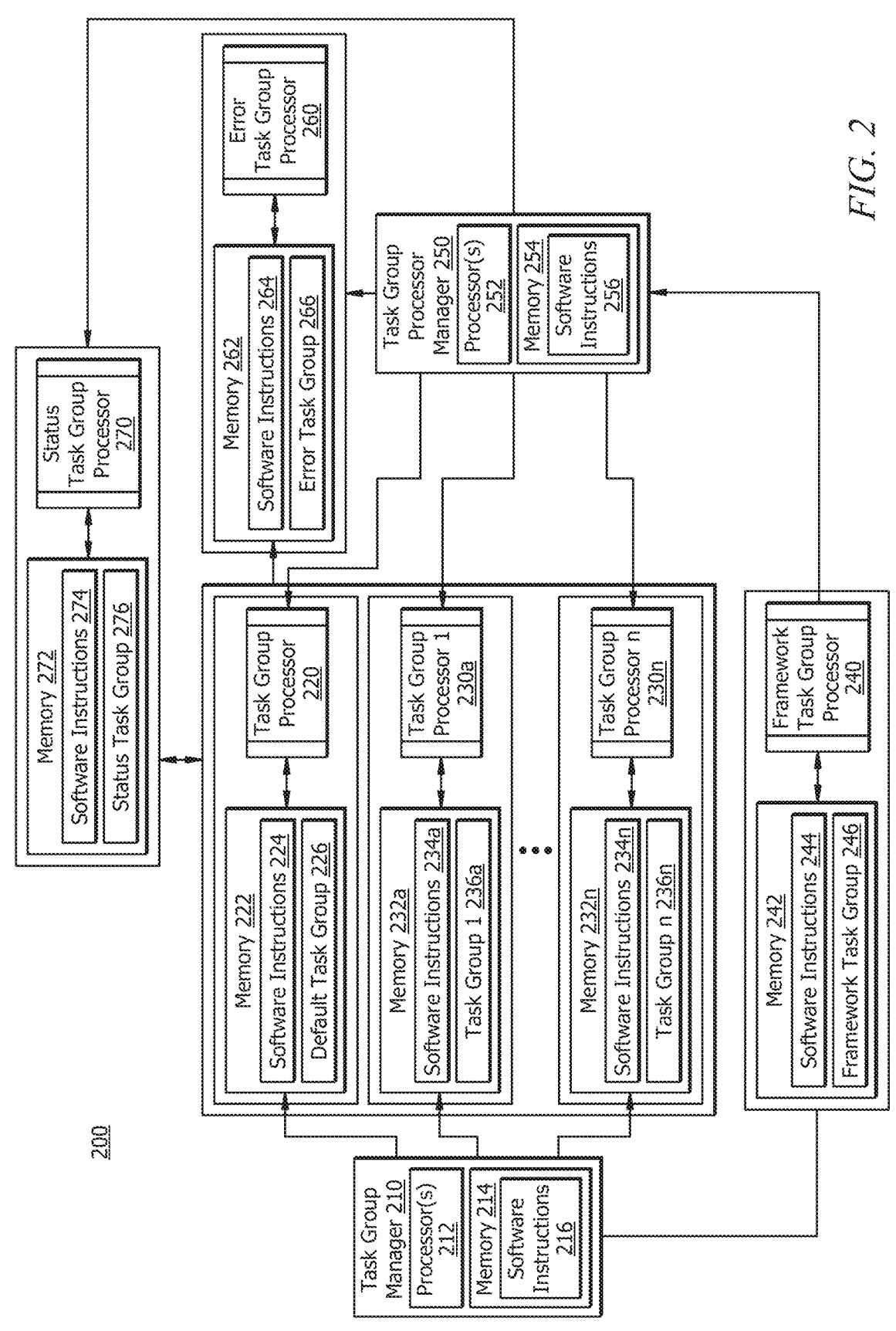
FIG. 2 illustrates one embodiment of the self-governing and self-monitoring system.
Figure 3:
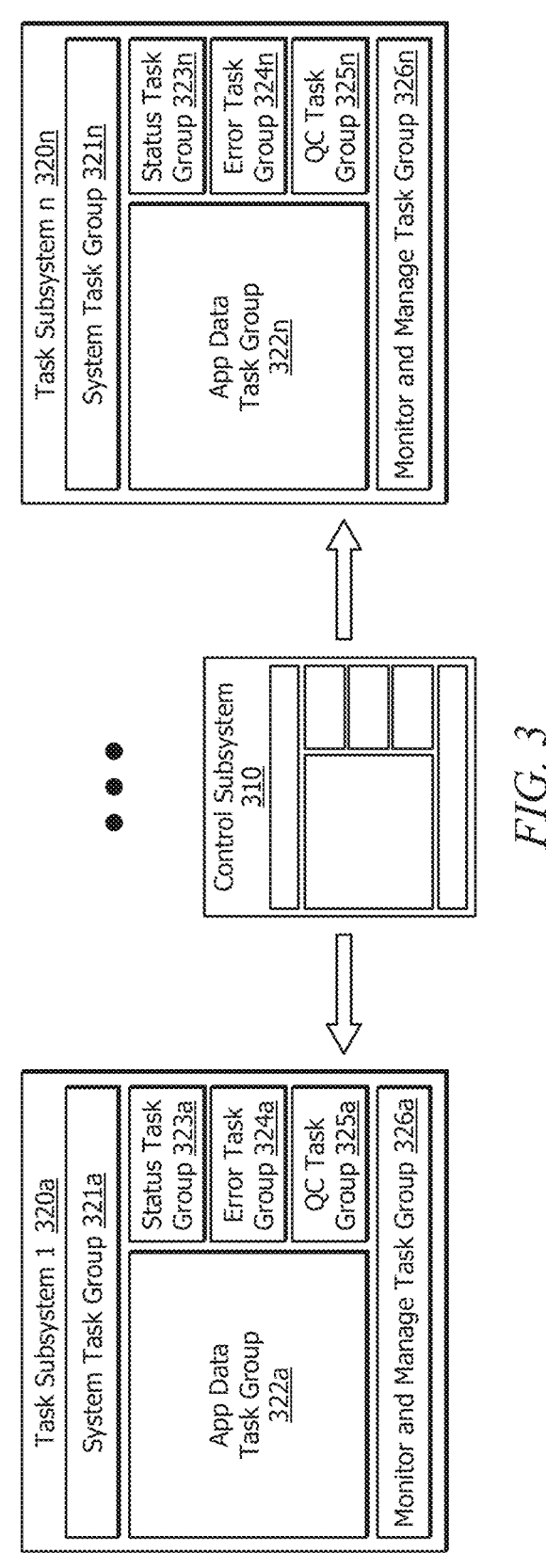
FIG. 3 illustrates one embodiment of the federated system.
Figure 4:
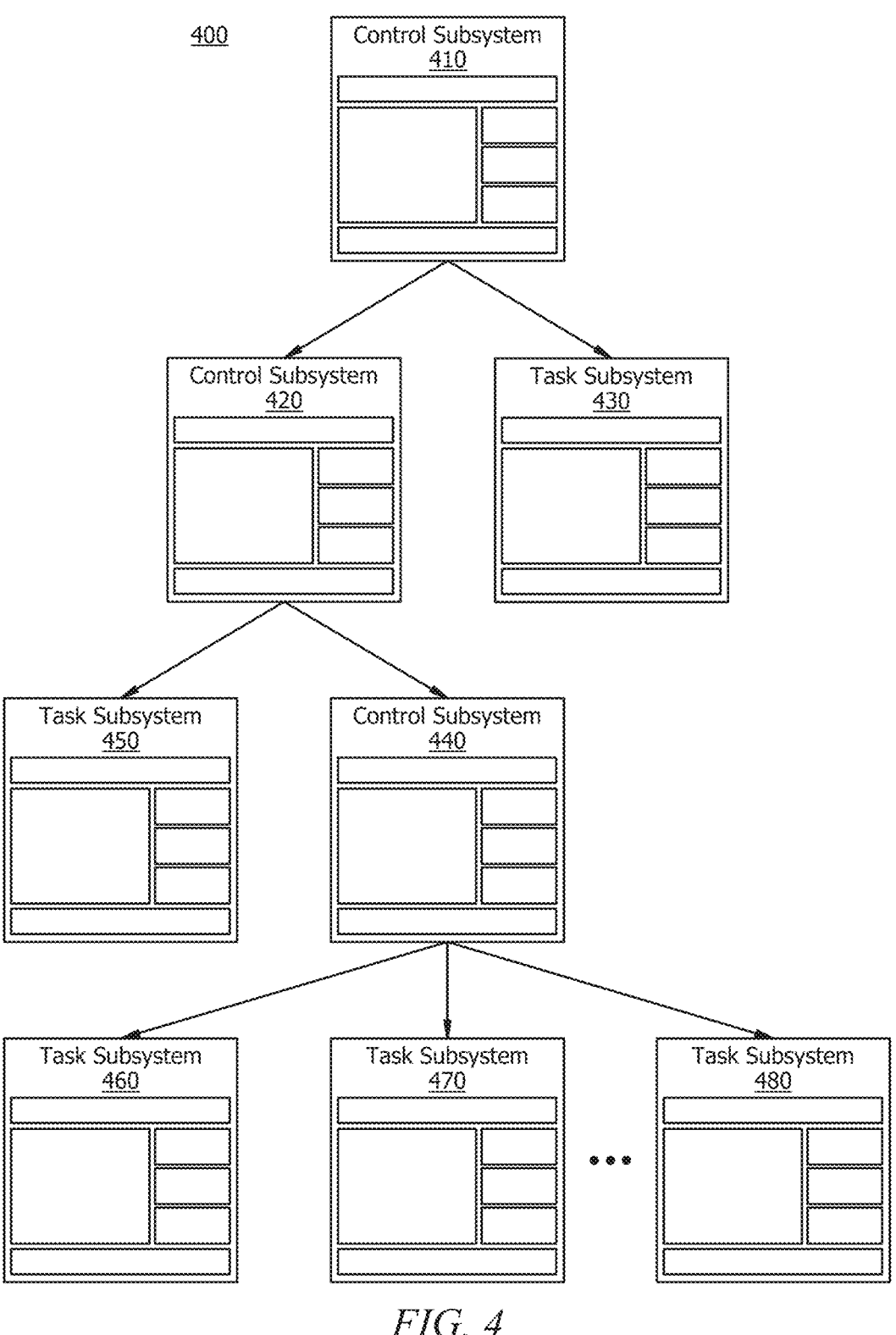
FIG. 4 illustrate an example operational flow for federated execution of anonymization tasks.
Figure 6A:
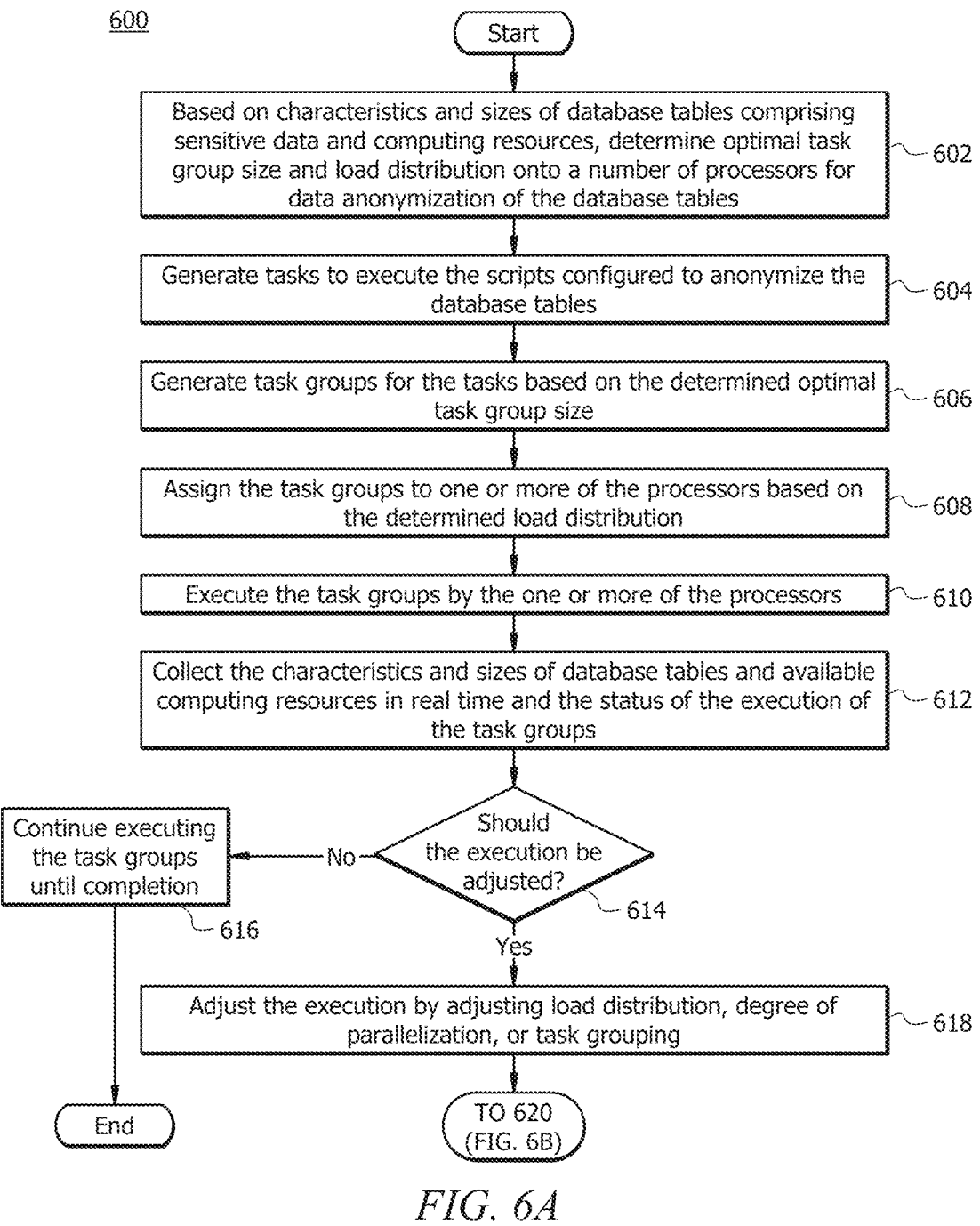
FIGS. 6A-6B illustrate an example flowchart of a method for self-governing and self-monitoring execution of anonymization tasks.
Figure 6B:
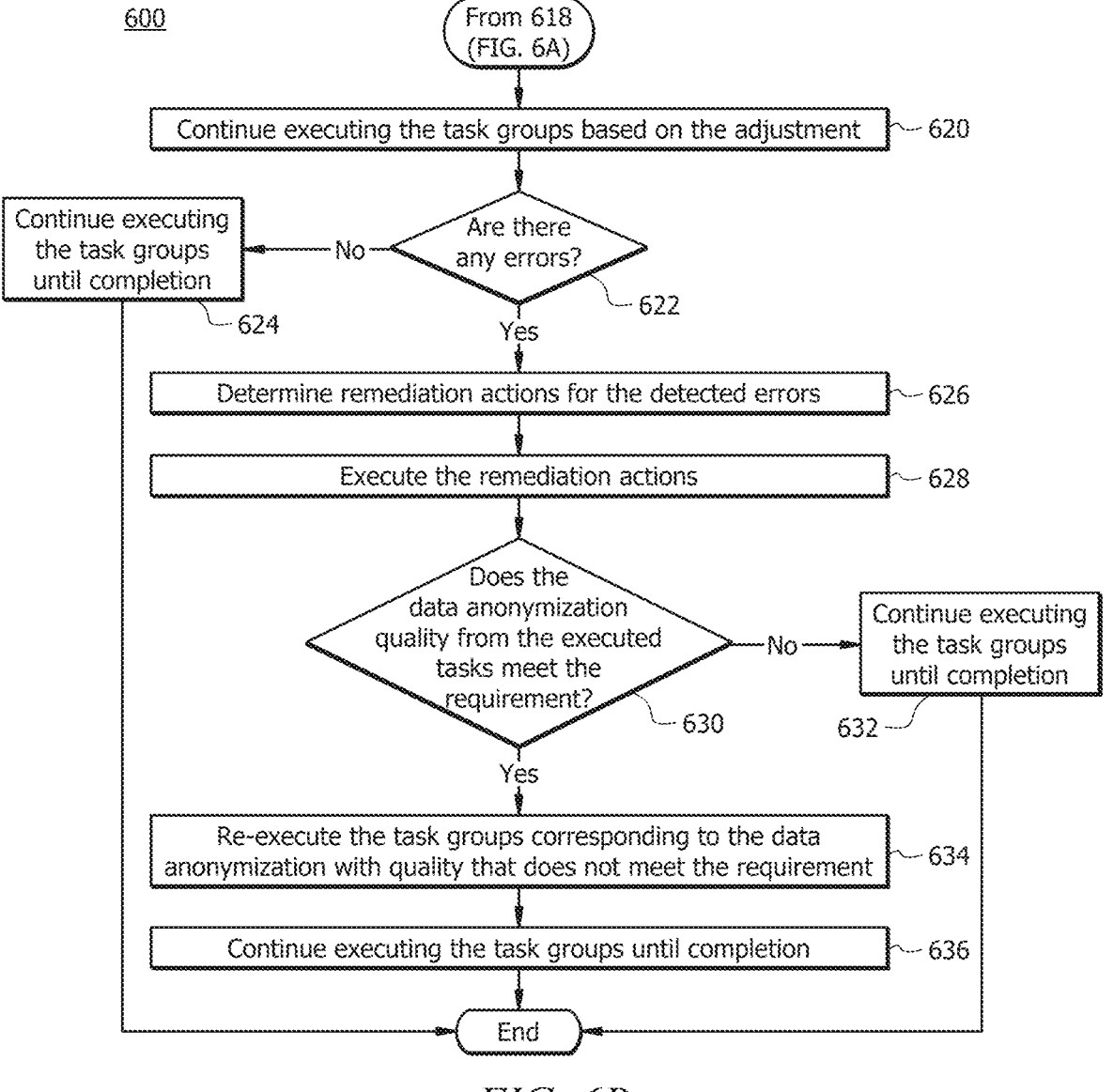
Figure 7:
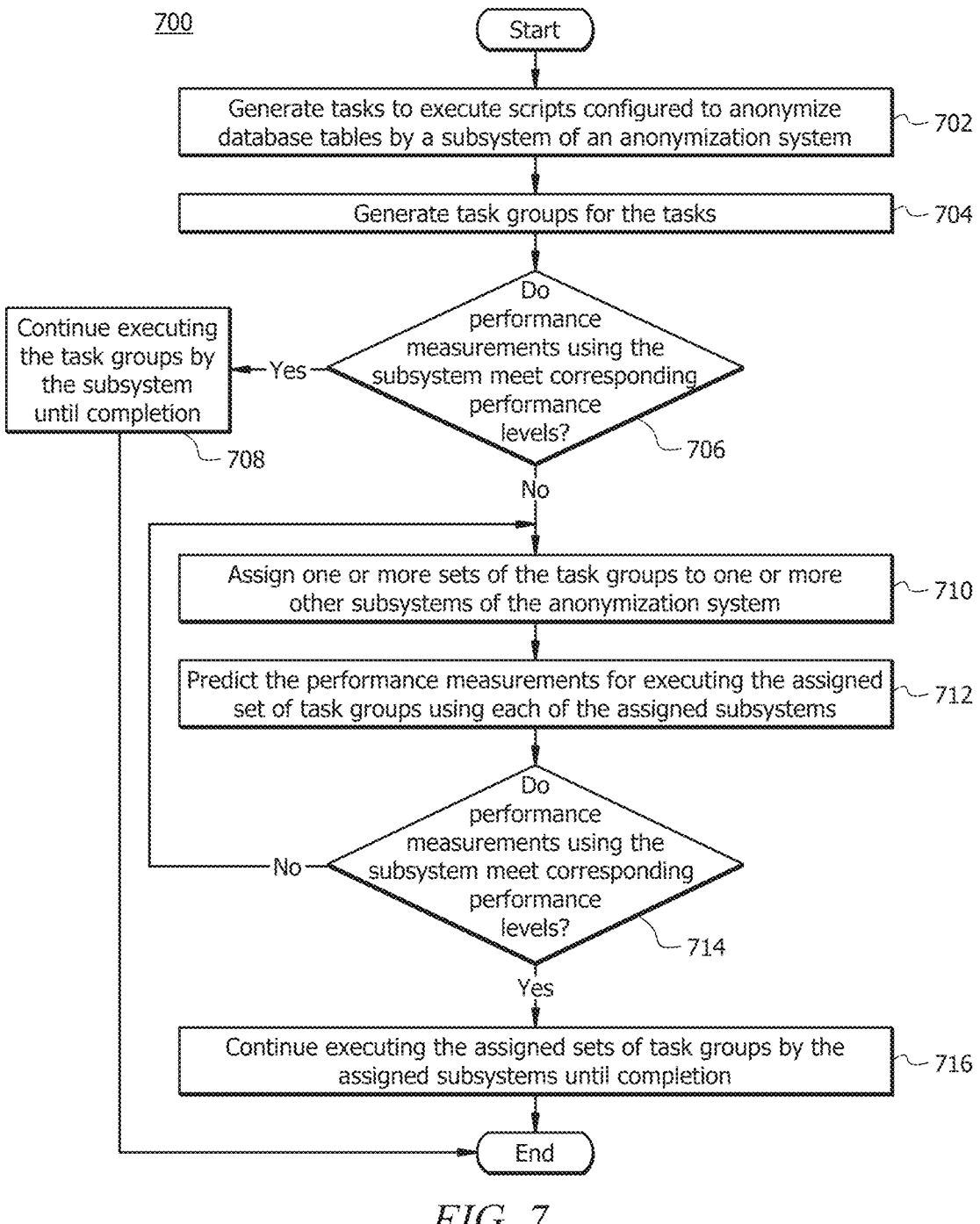
FIG. 7 illustrates an example flowchart of a method for federated execution of anonymization tasks.

As described above, data anonymization is important for preventing sensitive data from being accessed by unauthorized entities. This disclosure provides various systems and methods to anonymize large databases efficiently and effectively. FIG. 1 illustrates one embodiment of a system that is configured for data anonymization for large databases. FIG. 2 illustrates one embodiment of the self-governing and self-monitoring system. FIG. 3 illustrates one embodiment of the federated system. FIG. 4 illustrate an example operational flow for federated execution of anonymization tasks. FIG. 5 illustrates an example flowchart of a method for generating scripts to anonymize large databases. FIGS. 6A-6B illustrate an example flowchart of a method for self-governing and self-monitoring execution of anonymization tasks. FIG. 7 illustrates an example flowchart of a method for federated execution of anonymization tasks.

Example System for Data Anonymization

FIG. 1 illustrates one embodiment of a system 100 that is configured for data anonymization for large databases. System 100 comprises an anonymization system 110, a storage 120, and a network 130. In some embodiments, system 100 may not have all of the components listed and/or may have other elements instead of, or in addition to, those listed above.

System Components

Anonymization System

Anonymization system 110 is generally any device that is configured to process data and communicate with devices (e.g., storage 120), databases (e.g., database 122), systems, etc. Anonymization system 110 is generally configured to perform operations described further below in conjunction with method 500 described in FIG. 5, method 600 described in FIGS. 6A-6B, and method 700 described in FIG. 7. In one embodiment, anonymization system 110 comprises processors 112 in signal communication with a memory 114.

Processors 112 comprise one or more processors operably coupled to the memory 114. Processors 112 are any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processors 112 may be a programmable logic device, a microcontroller, a microprocessor, or any suitable combination of the preceding. Processors 112 are communicatively coupled to and in signal communication with memory 114 and storage 120. Processors 112 are configured to process data. For example, processors 112 may be 8-bit, 16-bit, 32-bit, 64-bit or of any other suitable architecture. Processors 112 may include an arithmetic logic unit (ALU) for performing arithmetic and logic operations, processors register that supply operands to the ALU and store the results of ALU operations, and a control unit that fetches software instructions 116 from memory 114 and executes them by directing the coordinated operations of the ALU, registers and other components. Processors 112 are configured to implement various software instructions 116. For example, processors 112 are configured to execute software instructions 116 to implement the functions disclosed herein, such as some or all of those described with respect to FIGS. 1-7. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store the software, and/or any other data or software instructions 116. The software instructions 116 may comprise any suitable set of instructions, logic, rules, or code operable to execute the processors 112. In one embodiment, the software instructions 116 may comprise a plurality of scripts config- ured to anonymize database tables 124. The software instructions 116, when executed by the processors 112, cause the processors 112 to perform one or more functions described herein. For example, when the software instruc- tions 116 are executed, the processors 112 execute the software instructions 116 (e.g., scripts) to anonymize data in tables 124 of large databases 122 accessed from the storage 120.

Storage

In particular embodiments, the system 100 comprises a storage 120 operably coupled to the anonymization system 110 via a network 130. Storage 120 is generally any device that is configured to store and process data and communicate with other components of the system 100 via the network 130. Storage 120 may store a plurality of databases 122, e.g., database 122a, database 122b, and database 122n. Each database 122 comprises one or more tables 124, e.g., table 124a in database 122a, table 124b in database 122b, and table 124n in database 122n. The database tables 124 may comprise sensitive data. As an example, and not by way of limitation, the sensitive data comprises non-public personal information (NPPI). Each table may include a plurality of columns and a plurality of rows. Each column may corre- spond to a type of data. An entry of the table may store a data value. In operation, the anonymization system 110 accesses the database tables 124 from the storage 120 and stores them in memory 114.

Network Network 130 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 130 may be configured to support any suitable type of commu- nication protocol as would be appreciated by one of ordinary skill in the art.

Operational Flow for Data Anonymization

In particular embodiments, data anonymization can com- prise script generation and anonymization execution.

For script generation, anonymization system 110 may collect a list of sensitive data columns. Anonymization system 110 may then reduce the list of sensitive data columns to a distinct set of columns in a secure schema. Anonymization system 110 may then generate different scripts for different tasks. In one embodiment, anonymiza- tion system 110 may generate a script to create map tables for each distinct sensitive data element. The map table may have two columns to hold un-sanitized value and corre- sponding sanitized value. Anonymization system 110 may generate another script to scan multitude of databases 122 and database tables 124 to collect unique data values for each data element and populate un-sanitized value in respec- tive map tables. In some embodiments, anonymization sys- tem 110 may create clustered unique index on the sensitive data columns.

In one embodiment, anonymizing un-sanitized data col- lected and populate sanitized data column in map tables may follow the following rules or constraints. As an example, and not by way of limitation, sanitization for a given sensitive column in all databases should be the same regardless of data type. As another example, and not by way of limitation, sanitization should be done in a way that it preserves data transformation. As yet another example, and not by way of limitation, sanitization should take application specific rules on a sensitive column. As yet another example, and not by way of limitation, sanitization of data should be validated with random checks for correctness and completeness.

Anonymization system 110 may generate another script to update corresponding un-sanitized values in all database tables in scope.

For anonymization execution, anonymization system 110 may plan, generate, distribute, and execute data anonymiza- tion tasks for processing for best execution. Based on characteristics (e.g., size, partition state, number and size of partitions, underlying database files, location and drive or disk space) of database tables and processor resources (e.g., number, capacity, and availability), anonymization system 110 may generate a task execution plan, e.g., determining the optimal task group size and load distribution onto a number of processors to process the task group.

In one embodiment, determining the optimized process- ing of anonymization tasks using partitioned tables may be by using the size of table and table partitions and temporary table to store intermediate data. Determining the optimized processing of anonymization tasks using non-partitioned tables may be by using logical partition data using ordinal columns.

Anonymization system 110 may generate autonomous anonymization tasks in real time within the constraints of the application associated with the databases and other depen- dencies. Anonymization system 110 may perform pre-check, e.g., verifying the integrity of tasks and data objects.

Anonymization system 110 may then execute the anony- mization group tasks in a distributed fashion. During the real-time execution, anonymization system 110 may collect the statistics of the database tables and available processor resources in real time and also collect the status of the process to determine whether a revision to the execution plan is required. Anonymization system 110 may adjust the execution plan, e.g., load distribution, degree of paralleliza- tion, task grouping, etc., to yield the best execution perfor- mance as needed.

Anonymization system 110 may further perform post- check to ensure data integrity of the anonymized data.

Example Self-Governing and Self-Monitoring System for Task Execution

In one embodiment, anonymization system 110 may be a self-governing and self-monitoring system. FIG. 2 illustrates one embodiment of the self-governing and self-monitoring system 200. System 200 comprises a task group manager 210, a task group processor 220, a plurality of task group processors 230, a framework task group processor 240, a task group processor manager 250, an error task group processor 260, and a status task group processor 270. In some embodiments, system 200 may not have all of the components listed and/or may have other elements instead of, or in addition to, those listed above.

System Components

Task Group Manager

In one embodiment, task group manager 210 comprises processor(s) 212 in signal communication with a memory 214. Processor(s) 212 are configured to implement various software instructions 216 stored in memory 214. For example, processor(s) 212 are configured to execute software instructions 216 (e.g., scripts configured to anonymize database tables 124) to generate task groups of data anonymization tasks. As an example, and not by way of limitation, generating the task groups may be based on characteristics (e.g., size, partition state, number and size of partitions, underlying database files, location and drive or disk space) of database tables and processor resources (e.g., number, capacity, and availability).

Task Group Processor

In particular embodiments, system 200 comprises a task group processor 220 in signal communication with a memory 222. Task group processor 220 is configured to implement various software instructions 224 (e.g., scripts configured to anonymize database tables 124) stored in memory 222. Memory 222 may additionally store a default task group 226, which may be set by default comprising any suitable task group. For example, task group processor 220 is configured to execute software instructions 224 to execute the default task group.

System 200 additionally comprises a plurality of task group processors 230, each in signal communication with a respective memory 232. For example, task group processor 230a is in signal communication with memory 232a and task group processor 230n is in signal communication with memory 232n. Each memory 232 may store software instructions 234 (e.g., scripts configured to anonymize database tables 124) and a task group 236 designated to the task group processor 230 in communication with that memory 232. For example, memory 232a stores software instructions 234a and task group 1 236a designated to the task group processor 230a; memory 232n stores software instructions 234n and task group n 236n designated to the task group processor 230n. Task group processor 230 is configured to implement various software instructions 234 to execute its corresponding task group 236. For example, task group processor 230a is configured to execute software instructions 234a to execute task group 1 236a; task group processor 230n is configured to execute software instructions 234n to execute task group n 236n.

In particular embodiments, task group processor 220 and the task group processors 230 are configured to execute their respective task groups independently in a distributed manner. One or more of the task group processor 220 and the task group processors 230 may be on the same or different servers.

Framework Task Group Processor

In one embodiment, framework task group processor 240 is configured to start, suspend, or terminate executions of task groups. Framework task group processor 240 is in signal communication with a memory 242. Framework task group processor 240 is configured to implement various software instructions 244 (e.g., scripts configured to anonymize database tables 124) stored in memory 242. Memory 242 may additionally store framework task group 246, which may include task groups to be started, suspended, or terminated. Framework task group processor 240 is configured to execute software instructions 244 to communicate the start, suspending, or termination of the execution of the task groups to task group processor manager 250, which may further instruct one or more of the task group processor 220 and the task group processors 230 to start, suspend, or terminate the execution of relevant task groups.

Task Group Processor Manager

In one embodiment, task group processor manager 250 is configured to monitor and adjust executions of task groups. Task group processor manager 250 comprises processor(s) 252 in signal communication with a memory 254. Processor(s) 252 are configured to implement various software instructions 256 (e.g., scripts configured to anonymize database tables 124) stored in memory 214. Processor(s) 252 are configured to execute software instructions 256 to constantly check each of the task group processor 220 and the plurality of task group processors 230 for performance objectives of the execution. For example, if the performance objectives are not met, processor(s) 252 are configured to add additional processors to execute the task groups as needed so that the task groups can be automatically designated to the next available processor.

Error Task Group Processor

In one embodiment, error task group processor 260 is configured to detect and remediate errors. Error task group processor 260 is in signal communication with a memory 262. Error task group processor 260 is configured to implement various software instructions 264 (e.g., scripts configured to anonymize database tables 124) stored in memory 262. Memory 262 may additionally store error task group 266, which may include tasks that encountered execution errors. Error task group processor 260 is configured to execute software instructions 224 to categorize the errors and manage them. The errors may include server errors and data errors. As an example, and not by way of limitation, system errors may include space issue, for which error task group processor 260 may trigger shrinking or expanding of the space for data files. System errors may also include dead lock issue, for which error task group processor 260 may pause the task and re-execute it after a certain threshold amount of time. As another example, and not by way of limitation, data errors may include data conversion error, for which error task group processor 260 may convert the data into a common data type. Data errors may also include unique constraints, for which error task group processor 260 may recheck the map tables and re-populate the data.

In particular embodiments, error task group processor 260 is in signal communication with task group processor manager 250. Upon detecting errors and determining remediation actions, error task group processor 260 may resubmit tasks that encountered errors and the remediation actions to task group processor manager 250. Task group processor manager 250 may then assign the tasks to one or more of the task group processor 220 and the task group processors 230 for re-execution.

Status Task Group Processor

In one embodiment, status task group processor 270 is configured to determine and notify status of executions of task groups. Status task group processor 270 is in signal communication with a memory 272. Status task group processor 270 is configured to implement various software instructions 274 (e.g., scripts configured to anonymize database tables 124) stored in memory 272. Memory 272 may additionally store status task group 276, which may include execution status of the task groups. Status task group processor 270 is configured to execute software instructions 274 to request execution status of the task groups from each of the task group processor 220 and the plurality of task group processors 230. Status task group processor 270 is additionally configured to execute software instructions 274 to generating a notification comprising the status of the execution of the plurality of task groups.

Operational Flow for Self-Governing and Self-Monitoring Data Anonymization

Task group manager 210 may generate task groups of data anonymization tasks based on the anonymization scripts. The anonymization task groups are then executed in a distributed fashion, i.e., with one task group executing on one task group processor. During the execution, task group processor manager 250 monitors and manages the task group processors, collects the statistics of the data and available processor resources in real-time and status of the execution to determine whether the execution should be adjusted. During the execution, error task group processor 260 additionally checks execution errors and remediates them. Error task group processor 260 communicates the errors and remediations to task group processor manager 250, which re-submits the corresponding tasks for execution.

In one embodiment, system 200 generates a plurality of tasks to execute the scripts stored in the memory. System 200 then determines current capacity and current availability associated with the processors of system 200. System 200 then determines current characteristics associated with the database tables. System 200 then generates a plurality of task groups for the plurality of tasks based on one or more of current capacity associated with the processors, current availability associated with the processors, or current characteristics associated with the database tables. System 200 then executes the plurality of task groups. During the execution, system 200 further assigns the plurality of task groups to one or more processors of the processors, executes the plurality of task groups by the one or more of the processors, determines current capacity and current availability associated with the processors, current characteristics associated with the database tables, and status of the execution of the plurality of task groups, and adjusts the execution based on one or more of current capacity associated with the processors, current availability associated with the processors, current characteristics associated with the database tables, or the status of the execution.

Example Federated System for Anonymization Task Execution

In one embodiment, anonymization system 110 may be a federated system. The federated system can further conduct federated execution of anonymization tasks of database tables. The federated system can be based on multiple subsystems, with each running on one or more processors.

FIG. 3 illustrates one embodiment of the federated system 300. System 300 comprises a control subsystem 310 and a plurality of task subsystems 320 (e.g., task subsystem 320*a* through task subsystem 320*n*). Each subsystem may comprise all the components of system 200 illustrated in FIG. 2 and can be a self-monitoring and self-governing system. The subsystems can be either logically separated or physically separated. Using the subsystems, anonymization system 100 can federate the workload. In some embodiments, system 300 may not have all of the components listed and/or may have other elements instead of, or in addition to, those listed above.

System Components

Task Subsystem

Each of the task subsystems 320 may comprise a system task group 321, an app data task group 322, a status task group 323, an error task group 324, a quality-control (QC) task group 325, and a monitor and manage task group 326.

In one embodiment, the system task group 321 may correspond to task group manager 210 illustrated in FIG. 2. The app data task group may comprise the task group processor 220 and memory 222; and the plurality of task group processors 230 and their associated memory 232 illustrated in FIG. 2. The status task group 323 may comprise the status task group processor 270 and memory 272. The error task group 324 may comprise the error task group processor 260 and memory 262. The QC task group 325 may be part of the task group processor manager 250. The monitor and manage task group 326 may comprise the framework task group processor 240 and memory 242, and the task group processor manager 250.

Control Subsystem

Control subsystem 310 may check performance objectives and task execution status associated with each task subsystem 320. Control subsystem 310 may determine whether more or fewer task subsystems 320 are required to achieve the performance objectives. In some embodiments, control subsystem 310 may comprise the same components as task subsystem 320.

Operational Flow for Federated Execution of Anonymization Tasks

FIG. 4 illustrate an example operational flow 400 for federated execution of anonymization tasks. Upon determining the task groups with each including multiple anonymization tasks, a first subsystem 410 determines that performance objectives cannot be achieved with current configuration. The first subsystem 410 then assigns the task groups to one or more second subsystems (e.g., subsystem 420 and subsystem 430) by replicating itself into the one or more second subsystems. In some embodiments, factors that may influence self-replication may include nature and size of data, resource or capacity availability, and delivery constraints. The first subsystem 410 becomes a control subsystem 410 and the second subsystems become task subsystems. In some embodiments, the first subsystem 410 is configured to control the one or more second subsystems.

Each second subsystem further determines if the performance objectives can be reached. If the performance objectives can be reached, the second subsystem executes the assigned task groups as a task subsystem. In this scenario, the one or more second subsystems are configured to execute the assigned task groups. If the performance objectives cannot be reached, one of the second subsystem further assigns some of the task groups to one or more third subsystems. For example, subsystem 430 can achieve the performance objectives and will execute the assigned task groups as a task subsystem. Subsystem 420 cannot achieve the performance objectives and will replicate itself into more subsystems (e.g., subsystem 440 and subsystem 450) and become a control subsystem itself. In this scenario, the one or more second subsystems comprise a second subsystem configured to control the one or more third subsystems and another second subsystem configured to execute a subset of the assigned task groups. The process continues until all task subsystems can execute the task groups with the performance objectives achieved. For example, subsystem 450 will execute the assigned task groups as a task subsystem. Subsystem 440 will replicate itself into more subsystems (e.g., subsystem 460, subsystem 470, and subsystem 480). Subsystem 460, subsystem 470, and subsystem 480 will execute their assigned task groups as task subsystems.

As can be seen from FIG. 4, the plurality of subsystems are associated with each other based on a tree structure. A root node of the tree structure corresponds to a subsystem (e.g., control subsystem 410) configured to control one or more subsystems (e.g., control subsystem 420 and task subsystem 430) of the remaining subsystems. One or more leaf nodes of the tree structure correspond to one or more subsystems (e.g., task subsystem 430, task subsystem 450, and task subsystems 460-480) configured to execute the task groups.

For each control subsystem, app data task group may be disabled. Other execution components of the control subsystem (e.g., status task group, error task group, QC task group, and monitor and manage task group) may continue to function to collect status of their associated task subsystems and manage them.

For each task subsystem, all components, including app data task group, are executed.

Federated execution of anonymization tasks may have elasticity. In other words, the number of subsystems may grow or shrink based on needs of the executions. In some embodiments, the first subsystem predicts the performance measurements for executing the task groups using the first subsystem meet the required performance levels based on current characteristics associated with the database tables and status of the execution of the task groups. Accordingly, the first subsystem reassigns all sets of the task groups from the second subsystems to the first subsystem for execution.

In one embodiment, system 300 generates a plurality of tasks to execute the scripts. A first subsystem of system 300 then generates a plurality of task groups for the plurality of tasks. The first subsystem then predicts one or more performance measurements for executing the plurality of task groups using the first subsystem do not meet required performance levels. The first subsystem further assigns one or more sets of the task groups to one or more second subsystems of system 300. At least one of the one or more second subsystems predict the performance measurements for executing the assigned set of task groups using the second subsystem. The at least one second subsystem then execute the assigned set of task groups using the second subsystem if the predicted performance measurements meet the required performance levels. The at least one second subsystem further assign one or more subsets of the assigned set of task groups to one or more third subsystems if the predicted performance measurements do not meet the required performance levels.

Example Methods for Data Anonymization

FIG. 5 illustrates an example flowchart of a method 500 for generating scripts to anonymize large databases. Modifications, additions, or omissions may be made to method 500. Method 500 may include more, fewer, or other operations. For example, operations may be performed in parallel or in any suitable order. While at times discussed as anonymization system 110, system 200, system 300, or components of any of thereof performing operations, any suitable system or components of the system may perform one or more operations of the method 500. For example, one or more operations of method 500 may be implemented, at least in part, in the form of software instructions (e.g., software instructions 116 of FIG. 1), stored on non-transitory, tangible, machine-readable media (e.g., memory 114 of FIG. 1) that when run by one or more processors (e.g., processors 112 of FIG. 1) may cause the one or more processors to perform operations 502-520.

After start, anonymization system 110 accesses a plurality of database tables associated with different applications (e.g., from the memory 114) at operation 502.

At operation 504, anonymization system 110 collects a list of data elements (e.g., columns) corresponding to the sensitive data from the plurality of database tables.

At operation 506, anonymization system 110 reduces the list of data elements to a distinct list of data elements by removing redundant data elements from the list of data elements to minimize the size of the data for anonymization.

In some embodiments, accessing the plurality of database tables, collecting the list of data elements, or reducing the list of data elements to the distinct list of data elements is based on structured query language (SQL).

At operation 508, anonymization system 110 determines whether the distinct list is generated following application constraints. If not, method 500 returns to operation 506 to regenerate the distinct list of data elements. If yes, method 500 proceeds to operation 510.

At operation 510, anonymization system 110 generates a first script configured to generate map tables for each data element of the distinct list of data elements. Each map table comprises a first column to hold original values associated with the data element and a second column to hold anonymized values for the original values.

At operation 512, anonymization system 110 generates a second script configured to scan the plurality of database tables to collect original values for each data element of the distinct list of data values and populate the original values in a respective map table corresponding to the data element.

At operation 514, anonymization system 110 generates a third script configured to anonymize the collected original values for each data element and populate the anonymized values in a respective map table corresponding to the data element. In some embodiments, anonymizing the collected original values for each data element comprises anonymizing the collected original values for a first data element across the plurality of database tables using a same rule, a same calculation, or a same algorithm. For example, anonymizing the collected original values for each data element comprises anonymizing the collected original values for a first data element in a first database table which is associated with a first application. Correspondingly, anonymizing the collected original values for the first data element in the first database table is based on one or more rules associated with the first application. In some embodiments, the original values for a first data element may be transformed based on a first logic. In this situation, the first logic applies to the anonymized values for the first data element as well.

At operation 516, anonymization system 110 determines whether the anonymization is following application constraints. If not, method 500 returns to operation 514 to re-generate the third script. If yes, method 500 proceeds to operation 518.

At operation 518, anonymization system 110 generates a fourth script configured to update the original values using the corresponding anonymized values in the plurality of database tables based on the map tables.

At operation 520, anonymization system 110 executes the first, second, third, and fourth scripts to anonymize the sensitive data in the plurality of database tables. In some embodiments, anonymization system 110 may validate the anonymization of the collected original values for each data element after the execution.

Method 500 then ends.

FIGS. 6A-6B illustrate an example flowchart of a method 600 for self-governing and self-monitoring execution of anonymization tasks. Modifications, additions, or omissions may be made to method 600. Method 600 may include more, fewer, or other operations. For example, operations may be performed in parallel or in any suitable order. While at times discussed as anonymization system 110, system 200, system 300, or components of any of thereof performing operations, any suitable system or components of the system may perform one or more operations of the method 600. For example, one or more operations of method 600 may be implemented, at least in part, in the form of software instructions (e.g., software instructions 216, 224, 234, 244, 256, 264, and 274 of FIG. 2), stored on non-transitory, tangible, machine-readable media (e.g., memory 214, 222, 232, 242, 254, 262, and 272 of FIG. 2) that when run by one or more processors (e.g., processors 212, 220, 230, 240, 252, 260, and 270 of FIG. 2) may cause the one or more processors to perform operations 602-636.

Now referring to FIG. 6A, after start, anonymization system 110 determines optimal task group size and load distribution onto a number of processors for data anonymization of the database tables based on current characteristics and sizes of database tables comprising sensitive data and computing resources (e.g., current capacity and current availability associated with the processors) at operation 602.

At operation 604, anonymization system 110 generates a plurality of tasks to execute the scripts stored in the memory. The scripts are configured to anonymize database tables.

At operation 606, anonymization system 110 generates a plurality of task groups for the plurality of tasks based on the determined optimal task group size.

At operation 608, anonymization system 110 assigns the plurality of task groups to one or more processors of the processors based on the determined load distribution.

At operation 610, anonymization system 110 executes the plurality of task groups by the one or more of the processors.

At operation 612, anonymization system 110 collects the characteristics and sizes of database tables and available computing resources in real time and the status of the execution of the task groups. In other words, anonymization system 110 determines current capacity and current availability associated with the processors, current characteristics associated with the database tables, and status of the execution of the plurality of task groups.

At operation 614, anonymization system 110 determines whether the execution should be adjusted. If not, method 600 proceeds to operation 616, where anonymization system 110 continues executing the task groups until completion. Method 600 then ends.

If the execution should be adjusted, method 600 proceeds to operation 618. At operation 618, anonymization system 110 adjusts the execution by adjusting load distribution, degree of parallelization, or task grouping based on one or more of current capacity associated with the processors, current availability associated with the processors, current characteristics associated with the database tables, or the status of the execution. In some embodiments, adjusting the execution comprises reassigning one or more of the tasks groups to one or more of the processors, adding one or more of the processors for executing one or more of the task groups, adjusting a degree of parallelization associated with the execution of the plurality of task groups, or regrouping one or more of the tasks groups.

Now referring to FIG. 6B, at operation 620, anonymization system 110 continues executing the task groups based on the adjustment.

At operation 622, anonymization system 110 determines whether there are any errors associated with the execution of one or more tasks of the task groups. If there are no errors, anonymization system 110 continues executing the task groups until completion at operation 624. Method 600 then ends.

If there are any errors, method 600 proceeds to operation 626. At operation 626, anonymization system 110 determines one or more remediation actions for the one or more errors.

At operation 628, anonymization system 110 executes the one or more remediation actions. In some embodiments, executing the one or more remediation actions comprises resubmitting the one or more tasks and the remediation actions to one or more of the processors for re-execution and re-executing, by the one or more of the processors, the one or more tasks.

At operation 630, anonymization system 110 determines whether the data anonymization quality from the executed tasks meets the requirement (e.g., by comparing against a quality threshold). In some embodiments, determining the execution quality comprises one or more of determining data integrity of anonymized data in the database tables, determining accuracy of data elements in the database tables, determining accuracy of data objects associated with the tasks, determining data transformation preservation, or determining duplicate, null, or blank entries in the database tables.

If execution quality associated with the execution of the task groups meets the requirement (e.g., above the quality threshold), anonymization system 110 continues executing the task groups until completion at operation 632. Method 600 then ends.

If execution quality associated with the execution of the task groups does not meet the requirement (e.g., below the quality threshold), method 600 proceeds to operation 634. At operation 634, anonymization system 110 re-executes one or more of the task groups corresponding to the data anonymization with quality that does not meet the requirement.

At operation 636, anonymization system 110 continues executing the task groups until completion. Method 600 then ends.

FIG. 7 illustrates an example flowchart of a method 700 for federated execution of anonymization tasks. Modifications, additions, or omissions may be made to method 700. Method 700 may include more, fewer, or other operations. For example, operations may be performed in parallel or in any suitable order. While at times discussed as anonymization system 110, system 200, system 300, or components of any of thereof performing operations, any suitable system or components of the system may perform one or more operations of the method 700. For example, one or more operations of method 700 may be implemented, at least in part, in the form of software instructions (e.g., software instructions 216, 224, 234, 244, 256, 274, and 274 of FIG. 2), stored on non-transitory, tangible, machine-readable media (e.g., memory 214, 222, 232, 242, 254, 272, and 272 of FIG. 2) that when run by one or more processors (e.g., processors 212, 220, 230, 240, 252, 270, and 270 of FIG. 2) may cause the one or more processors to perform operations 702-716.

After start, a subsystem (e.g., a first subsystem) of anonymization system 110 generate a plurality of tasks to execute the scripts stored in the memory at operation 702. The scripts are configured to anonymize database tables.

At operation 704, the subsystem generates a plurality of task groups for the plurality of tasks.

At operation 706, the subsystem predicts whether one or more performance measurements for executing the plurality of task groups using the processors of the subsystem meet corresponding required performance levels. In some embodiments, predicting the performance measurements is based on characteristics and sizes associated with the database tables, capacity and availability associated with the processors, or application constraints associated with the database tables. If yes, the subsystem continues executing the task groups until completion at operation 708. Method 700 then ends.

If the subsystem predicts that one or more performance measurements for executing the plurality of task groups using the processors of the subsystem do not meet required performance levels, method 700 proceeds to operation 710.

At operation 710, the subsystem assigns one or more sets of the task groups to one or more other subsystems (e.g., second subsystems) of anonymization system 110.

At operation 712, at least one of the one or more assigned subsystems predict the performance measurements for executing the assigned set of task groups using the processors of each of the assigned subsystems.

At operation 714, the assigned subsystem predicts whether performance measurements using the processors of the subsystem meet corresponding performance levels. If not, method 700 returns to operation 710.

If performance measurements using the processors of the subsystem meet corresponding performance levels, method 700 proceeds to operation 716.

At operation 716, the assigned subsystem(s) continue executing the assigned sets of task groups until completion. Method 700 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

The invention claimed is:

1. A system for data anonymization, comprising:
   a memory operable to store a plurality of database tables comprising sensitive data; and
   a processor, operable coupled to the memory, and configured to:

access the plurality of database table from the memory;
   collect a list of data elements corresponding to the sensitive data from the plurality of database tables;
   reduce the list of data elements to a distinct list of data elements by removing redundant data elements from the list of data elements;
   generate a first script configured to generate map tables for each data elements of the distinct list of data elements, wherein each map table comprises a first column to hold original values associated with the data element and a second column to hold anonymized value for the original values;
   generate a second script configured to scan the plurality of database table to collect original values for each data element of the distinct list of a data values and populate the original values in a respective map table corresponding to the data element;
   generate a third script configured to anonymize the collected original values for each data element and populate the anonymized values in a respective map table corresponding to the data element; and
   generate a fourth script configured to update the original values using the corresponding anonymized values in the plurality of database table based on the map tables;
   wherein anonymizing the collected original values for each data element comprises anonymizing the collected original values for a first data element in a first database table, wherein the first database table is associated with a first application, and wherein anonymizing the collected original values for the first data element in the first database table is based on one or more rules associated with the first application.

2. The system of claim 1, wherein the processor is further configured to:
   execute the first, second, third and fourth scripts to anonymize the sensitive data in the plurality of database tables.

3. The system of claim 1, wherein anonymizing the collected original values for each data element comprises anonymizing the collected original values for a first data element across the plurality of database tables using a same rule, a same calculation, or a same algorithm.

4. The system of claim 1, wherein the processor is further configured to:
   transform the original values for a first data element based on a first logic, wherein the first logic applies to the anonymized values for the first data element.

5. The system of claim 1, wherein the processor is further configured to:
   validate the anonymization of the collected original values for each data element.

6. The system of claim 1, wherein the sensitive data comprises non-public personal information (NPPI).

7. The system of claim 1, wherein accessing the plurality of database tables, collecting the list of data elements, or reducing the list of data elements to the distinct list of data elements is based on structured query language (SQL).

8. A method for data anonymization comprising, by one or more computing systems:
   accessing a plurality of database tables comprising to the sensitive data;
   collecting a list of data elements corresponding to the sensitive data from the plurality of database tables;
   reducing the list of data elements to a distinct list of data elements by removing redundant data elements from the list of data elements;
   generating a first script configured to generate map tables for each data element of the distinct list of data elements, wherein each map table comprises a first column to hold original values associated with the data element and a second column to hold anonymized values for the original values;

generating a second script configured to scan the plurality of database tables to collect original values for each data element of the distinct list of data values and populate the original values in a respective map table corresponding to the data element;

generating a third script configured to anonymize the collected original values for each data element and populate the anonymized values in a respective map table corresponding to the data element; and generating a fourth script configured to update the original values using the corresponding anonymized values in the plurality of database tables based on the map tables;

wherein anonymizing the collected original values for each data element comprises anonymizing the collected original values for a first data element in a first database table, wherein the first database table is associated with a first application, and wherein anonymizing the collected original values for the first data element in the first database table is based on one or more rules associated with the first application.

9. The method of claim 8, further comprising:

executing the first, second, third, and fourth scripts to anonymize the sensitive data in the plurality of database tables.

10. The method of claim 8, wherein anonymizing the collected original values for each data element comprises anonymizing the collected original values for a first data element across the plurality of database tables using a same rule, a same calculation, or a same algorithm.

11. The most of claim 8, further comprising:

transforming the original values for a first data element based on a first logic, wherein the first logic applies to the anonymized values for the first data element.

12. The method of claim 8, further comprising:

validating the anonymization of the collected original values for each data element.

13. A non-transitory computer-readable medium storing instructions that when executed by a processor cause the processor to:

access a plurality of database tables comprising sensitive data;

collect a list of data elements corresponding to the sensitive data from the plurality of database tables;

reduce the list of data elements to a distinct list of data elements by removing redundant data elements from the list of data elements;

generate a first script configured to generate map tables for each data element of the distinct list of data elements, wherein each map table comprises a first column to hold original values associated with the data element and a second column to hold anonymized values for the original values;

generate a second script configured to scan the plurality of database tables to collect original values for each data element of the distinct list of data values and populate the original values in a respective map table corresponding to the data element;

generate a third script configured to anonymize the collected original values for each data element and populate the anonymized values in a respective map table corresponding to the data element; and generate a fourth script configured to update the original values using the corresponding anonymized values in the plurality of database tables based on the map tables;

wherein anonymizing the collected original values for each data element comprises anonymizing the collected original values for a first data element in a first database table, wherein the first database table is associated with a first application, and wherein anonymizing the collected original values for the first data element in the first database table is based on one or more rules associated with the first application.

14. The non-transitory computer-readable medium of claim 13, wherein the instructions further cause the processor to:

execute the first, second, third, and fourth scripts to anonymize the sensitive data in the plurality of database tables.

15. The non-transitory computer-readable medium of claim 13, wherein anonymizing the collected original values for each data element comprises anonymizing the collected original values for a first data element across the plurality of database tables using a same rule, a same calculation, or a same algorithm.

16. The non-transitory computer-readable medium of claim 13, wherein the instructions further cause the processor to:

transform the original values for a first data element based on a first logic, wherein the first logic applies to the anonymized values for the first data element.

17. The non-transitory computer-readable medium of claim 13, wherein the instructions further cause the processor to:

validate the anonymization of the collected original values for each data element.

* * * * *